United States Patent [19]

Knasel

[11] Patent Number: 5,373,781
[45] Date of Patent: Dec. 20, 1994

[54] FRUIT CUTTING AND CORING APPARATUS

[76] Inventor: Susan M. Knasel, 36 Heatherbrook La., Kirkwood, Mo. 63122

[21] Appl. No.: 40,522

[22] Filed: May 27, 1993

[51] Int. Cl.⁵ .............................................. A23N 4/20
[52] U.S. Cl. ....................................... 99/542; 99/544
[58] Field of Search ........................... 99/542–545; 83/588, 613, 621, 932; 100/213; 30/113.1, 113.2, 113.3

[56] References Cited

U.S. PATENT DOCUMENTS

| | | | |
|---|---|---|---|
| 83,494 | 10/1868 | Hassam | 99/545 |
| 86,045 | 1/1869 | Vaughn | 30/113.3 |
| 2,053,238 | 9/1936 | Dulany | 99/545 |
| 2,509,190 | 5/1950 | Langley | 99/545 |
| 2,625,972 | 1/1953 | Torres | 99/545 |
| 2,664,129 | 12/1953 | Coons | 99/543 |
| 3,128,810 | 4/1964 | Whipp | 99/545 |
| 3,203,343 | 8/1965 | Myers | 100/213 |
| 3,696,847 | 10/1972 | Erekson | 99/545 |
| 4,546,545 | 10/1985 | Hirano | 99/543 |
| 5,067,397 | 11/1991 | Healy | 99/544 |
| 5,142,973 | 9/1992 | Tur | 99/543 |

FOREIGN PATENT DOCUMENTS

| | | | |
|---|---|---|---|
| 817351 | 7/1949 | Germany | 99/545 |
| 67866 | 5/1914 | Switzerland | 99/545 |

*Primary Examiner*—David A. Scherbel
*Assistant Examiner*—Terrence R. Till
*Attorney, Agent, or Firm*—Polster, Lieder, Woodruff & Lucchesi

[57] ABSTRACT

Apparatus (10) for cutting the skin (S) of a piece of fruit (F) so it can be peeled off, and making a core (C) cut through the middle of the fruit. A base plate (12) has an upper surface (14) for supporting a piece of fruit in a position in which it can be cut and cored. An inner cutting blade (20) and an outer cutting blade (22) are movable from a first portion above the piece of the fruit toward the cutting board. These blades are coaxially aligned with each other. The inner blade is, for example, rectangular in cross-section to produce a generally rectangular cut in the piece of fruit core. The inner blade may have other configurations. The outer blade is a circular blade which cuts through the skin of the fruit so it can be peeled off. A handle mechanism (24) is used to simultaneously move the blades.

14 Claims, 2 Drawing Sheets

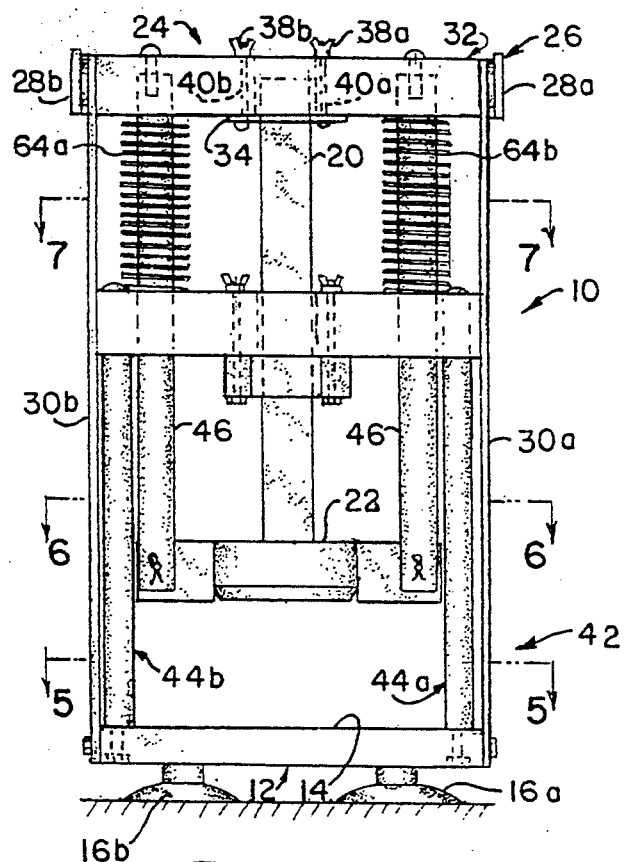
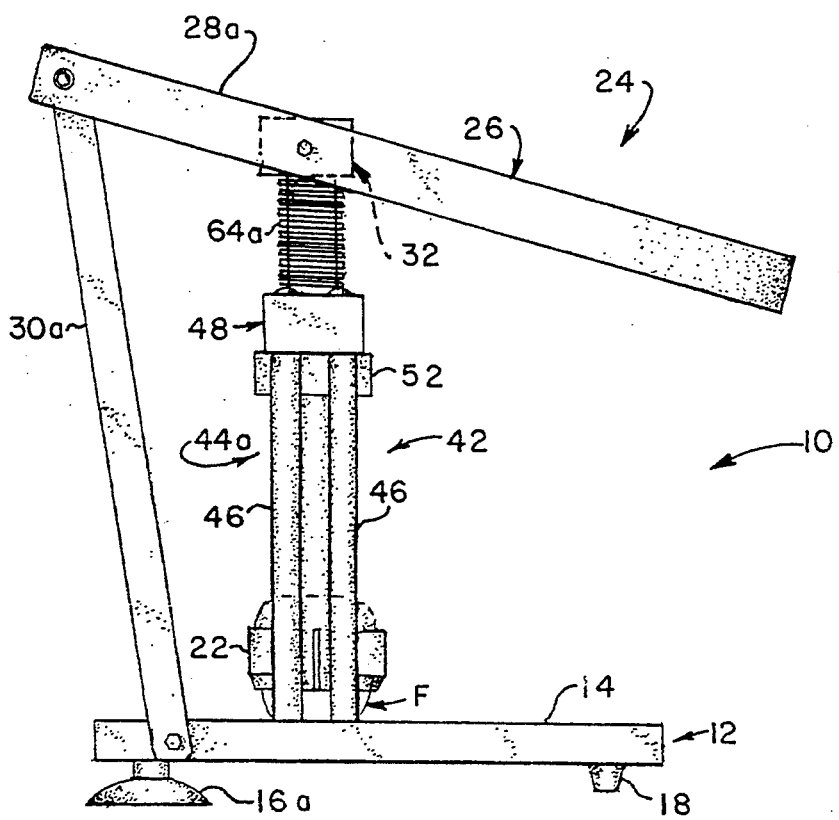

FRUIT CUTTING AND CORING APPARATUS

BACKGROUND OF THE INVENTION

This invention relates to supermarket appliances and more particularly to apparatus for simultaneously cutting the skin of a piece of fruit, so it can be peeled, and coring the fruit.

For displays in supermarkets, or for making fruit baskets or the like, a coring appliance is often used. This appliance is useful, for example, with fruits such as pineapples. One appliance of this type is disclosed in U.S. Pat. No. 5,067,397 to Healy. It has been found that for display purposes, a square or rectangular core of fruit is often just as appealing to the eye as a circular shaped core. Accordingly, if an appliance making a circular core is used, the fruit is further trimmed to provide a rectangular shape. This is both time consuming and costly. At the same time, it has also been found that the way in which the skin of the fruit is cut, to facilitate peeling the fruit, can also be improved.

SUMMARY OF THE INVENTION

Among the several objects of the present invention may be noted the provision of an apparatus for simultaneously cutting the skin of and coring a piece of fruit such as a pineapple, grapefruit, or melon; the provision of such an apparatus to cut the skin at an angle other than perpendicular to facilitate peeling the fruit; the provision of such an apparatus which is easy to use and relatively low in cost; the provision of such an apparatus to provide other non-circular shaped cores of fruit; and, the provision of such an apparatus which is easily movable and readily stored when not in use.

Briefly, the apparatus of the present invention is for coring and cutting the skin of fruit. The apparatus includes a base plate having an upper surface on which a piece of fruit is placed. This upper surface acts as a cutting board. An inner cutting blade has a square, rectangular, round, star-shaped or other cross-section to provide an appropriately shaped core when cutting through the fruit. An outer cutting blade is circular in shape to cut the skin of the fruit. A manually operable handle is used to simultaneously move both blades from a first position above the cutting board toward the cutting board so the respective are cuts and skin cuts core made. Other objects and features will be in part apparent and in part pointed out hereinafter.

BRIEF DESCRIPTION OF THE DRAWINGS

FIG. 1 is a cross-section of a piece of fruit illustrating the core and skin cuts made by the apparatus of the present invention;

FIGS. 2–4 are respective front, side, and top views of the apparatus;

Corresponding reference characters indicate corresponding parts throughout the drawings.

DESCRIPTION OF A PREFERRED EMBODIMENT

Figure 4:
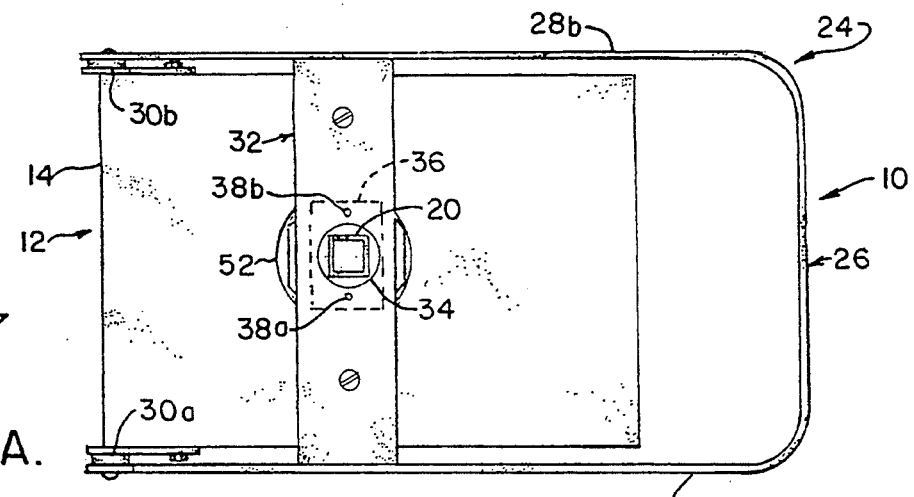

Referring to the drawings, a fruit cutting and coring apparatus of the present invention is indicated generally 10 in FIG. 2. The apparatus is used, for example, to simultaneously cut a decoratively shaped core C in a piece of fruit F, and cut through the skin S of the fruit as indicated at K1 and K2. The core shape may be square, rectangular, round, star-shaped, etc. While apparatus 10 is useful with fruit such as pineapples, other fruit such as melons and grapefruits can also be cored and skinned using the apparatus.

Figure 5:
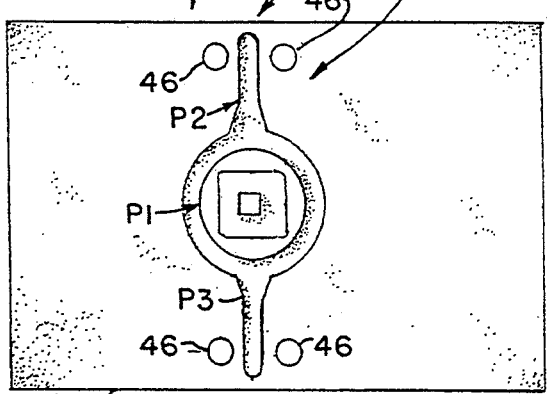
FIGS. 5–7 are respective sectional views taken along lines 5—5, 6—6, and 7—7 in FIG. 2; and, FIGS. 8A–8E are representative cross-sections of alternate inner cutting blades of the apparatus.
Figure 6:
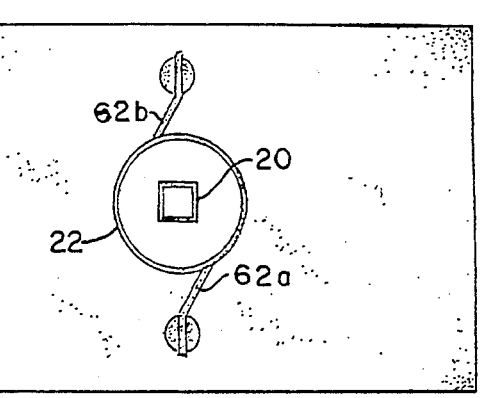
Figure 7:
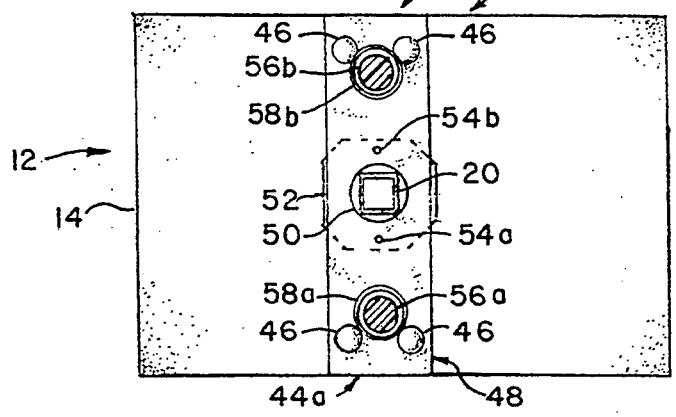

Apparatus 10 includes a base plate 12 which has an upper surface 14 forming a cutting board. As shown in FIG. 5, surface 14 may have inscribed therein a pattern P conforming to an outline for the fruit and for a cutting pattern provided by the apparatus. The pattern inscribed in surface 14 may include a center section P1 on which the piece of fruit is set to orient it relative to the cutting portion of the apparatus. It may also include outwardly extending inscribed arms P2 and P3 into which cutting blades described hereinafter fit when a cut is made. To support base 12, respective suction cups 16a, 16b are attached to one end of the underside of the cutting board. Posts 18 are attached to the underside of the cutting board at the other end. Use of the suction cups allows the apparatus to be firmly set in place on a table top (not shown) or other compatible support surface. It will be understood that suction cups 16 could be used at each end of plate 12, if desired.

Next, the apparatus includes an inner cutting blade 20 and an outer cutting blade 22. Blade 20 is, for example, rectangular in cross-section (see FIG. 8C) so to make a generally rectangular shaped core cut. Blade 22 is a circular blade and is used to make a circular cut through skin S of the fruit to facilitate peeling the fruit. Blades 20 and 22 are co-axially oriented with blade 22 being positioned outside of blade 20. Both blades are simultaneously movable from a first position above the piece of fruit (see FIG. 1) to a lowered position (FIG. 3) in which a core cut and skin cuts are made in the piece of fruit.

A manually operable handle means 24 is used to raise and lower blades 20 and 22. Means 24 includes a U-shaped lever handle 26 having arms 28a, 28b. The outer ends of each arm are rotatably attached to vertical posts 30a, 30b. The lower ends of the posts are affixed to the sides of base 12. A cross-member 32 extends between arms 28a, 28b at a point intermediate the length of the arms. Member 32 has a vertically extending circular opening 34 centered in the middle of the arm. The upper end of blade 20 fits into opening 34. Further, blade 20 has an integrally formed mounting plate 36 located sufficiently down the length of the blade shank so as to abut the underside of member 32 when the blade is mounted to the member. Plate 36 attaches to member 32, to attach blade 20 in place, by bolts 38a, 38b which fit through vertical bores 40a, 40b in member 32. The bores are located on opposite sides of opening 34.

Next, apparatus 10 includes a guide means 42 for guiding movement of the blades. Means 42 includes two pairs 44a, 44b of spaced apart poles 46 which extend vertically upward from base plate 12. An arm 48 is supported atop these posts, this arm being positioned directly beneath member 32. Arm 48 has a central opening 50 corresponding to opening 34 in member 32. Thus, blade 20 also extends through this opening to cut into the top of the piece of fruit. A guide block 52 is located on the underside of arm 48, and attaches to arm 48 by bolts 54a, 54b extending vertically through the arm. The opening 50 extends through block 52 to further guide movement of blade 20.

Rods 56a, 56b are mounted to the underside of member 32 and extend through respective openings 58a, 58b in arm 48. The lower ends of the rods have vertical slits 60a, 60b in which the outer ends of respective support blades 62a, 62b are carried. Blades 62a, 62b are integral with outer blade 22 to attach the outer blade to the posts for lowering and raising the outer blade. Blades 62a, 62b extend parallel to each other, but are not co-planar. Rather, the blades are set at an angle of between approximately 5° to 10° with respect to a diametric centerline extending through the outer blade between the rods. As seen in FIG. 1, blades 62a, 62b make the angled cuts K1, K2 through the skin of the fruit.

Respective springs 64a, 64b are mounted about rods 56a, 56b. The springs are mounted between member 32 and arm 48 and serve to bias member 32 upwardly.

Figure 8A:
Figure 8B:
Figure 8E:
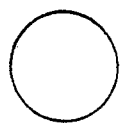
Figure 8D:
Figure 8C:
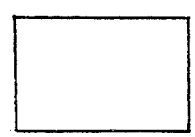

Referring to FIGS. 8A and 8E it will be seen that blade 20 may be one of a number of shapes. These shapes allow blade 20 to cut various decorative cores from a piece of fruit.

In view of the above, it will be seen that the various objects and features of this invention are achieved and other advantageous results obtained.

As various changes could be made in the above constructions without departing from the scope of the invention, it is intended that all matter contained in the above description or shown in the accompanying drawing shall be interpreted as illustrative and not in a limiting sense.

Having thus described the invention, what is claimed and desired to be secured by Letters Patent is:

1. An apparatus for coring and cutting a fruit, the fruit including a core, a pulp, and a peel, the apparatus including:
    a base plate having an upper surface forming a cutting board for supporting a piece of fruit in a position in which it can be cored and its skin cut;
    a manually operable handle pivotally mounted to said base including a pair of arms;
    a cross member extending between said arms, said cross member being vertically movable by operation of said handle;
    an inner cutting blade for separating the core from the pulp, the inner cutting blade extending downwardly from said cross member;
    an outer cutting blade operatively connected to said cross member for separating the peel from the pulp, said outer cutting blade being coaxial with said inner cutting blade;
    two peel cutting blades extending from said outer cutting blade for cutting the peel of said fruit, said cutting blades being parallel to, but not co-planar with, each other;
    whereby operation of said handle simultaneously moves cutting blades from a position above the cutting board toward the cutting board thereby to simultaneously core and peel the fruit and slice the fruit's peel.

2. The apparatus of claim 1 wherein the handle means includes first and second rods depending from opposite ends of the cross-member.

3. The apparatus of claim 2 further including a guide block positioned beneath said guide arm for further guiding movement of said inner blade.

4. The apparatus of claim 2 further including posts extending upwardly from said cutting board for supporting said guide arm.

5. The apparatus of claim 1 including posts extending downwardly from said cross-member, said peel cutting blades extending inwardly from said cross member posts to said outer cutting blade to support said outer cutting blade and operatively connect said outer cutting blade to said cross-member.

6. The apparatus of claim 5 wherein the cutting portions of the inwardly extending blades are each at an angle of approximately 10°–15° with respect to a diagonal line extending through the outer cutting blade from one post to the other.

7. The apparatus of claim 1 wherein the handle means further includes spring means urging the inner and outer cutting blades to their first position.

8. The apparatus of claim 1 further including suction means for mounting the base plate to the top of a table.

9. The apparatus of claim 8 wherein the suction means comprises at least one pair of suction cups attached to one end of the base plate.

10. The apparatus of claim 1 wherein the said inner cutting blade is attachable to said cross-member.

11. The apparatus of claim 10 further including alternate inner cutting blades each of which has a non-circular cross-section for making other types of core cuts in a piece of fruit.

12. The apparatus of claim 1 wherein said inner cutting blade is generally rectangular to form a generally rectangular core.

13. The apparatus of claim 1 including guide means having a guide arm supported above the cutting board with openings therein for guiding movement of said inner cutting blade.

14. The apparatus of claim 1 wherein the base has a pattern inscribed thereon, the pattern corresponding to the configuration of the blades to receive the blades when a cut is made.

* * * * *